US012611994B1

(12) United States Patent
Dai

(10) Patent No.: US 12,611,994 B1
(45) Date of Patent: Apr. 28, 2026

(54) ELECTRIC CART AND FOLDABLE STORAGE BASKET THEREOF

(71) Applicant: Xiamen Dalle New Energy Automobile Co., Ltd., Xiamen (CN)

(72) Inventor: Side Dai, Xiamen (CN)

(73) Assignee: Xiamen Dalle New Energy Automobile Co., Ltd., Xiamen (CN)

( * ) Notice: Subject to any disclaimer, the term of this patent is extended or adjusted under 35 U.S.C. 154(b) by 0 days.

(21) Appl. No.: 19/317,409

(22) Filed: Sep. 3, 2025

(51) Int. Cl.
*B60R 9/06* (2006.01)

(52) U.S. Cl.
CPC ..................................... *B60R 9/06* (2013.01)

(58) Field of Classification Search
CPC ... B60R 9/06; B60R 2011/0082; B60R 5/041; B60R 5/045; A63B 55/61
See application file for complete search history.

(56) References Cited

U.S. PATENT DOCUMENTS

| | | | | | |
|---|---|---|---|---|---|
| 1,606,954 | A * | 11/1926 | Moen | ..................... | B62D 43/02 |
| | | | | | 224/489 |
| 7,350,681 | B2 * | 4/2008 | Polburn | .................. | B60R 7/005 |
| | | | | | 296/37.16 |
| 10,899,284 | B2 * | 1/2021 | Descoteaux | ............ | B60R 11/06 |
| 11,858,466 | B2 * | 1/2024 | Gandolfo | ................ | B60R 7/043 |
| 2003/0173387 | A1 * | 9/2003 | Mitchell | ................... | B60R 9/06 |
| | | | | | 224/499 |
| 2009/0020576 | A1 * | 1/2009 | Gale | ........................ | B60R 9/06 |
| | | | | | 224/498 |
| 2015/0021371 | A1 * | 1/2015 | Ward | ........................ | B60R 9/06 |
| | | | | | 224/499 |
| 2016/0368427 | A1 * | 12/2016 | Field, Jr. | ................. | B60R 9/065 |
| 2019/0322220 | A1 * | 10/2019 | Linn | ........................ | B60R 5/041 |
| 2021/0316667 | A1 * | 10/2021 | Pinkston | ................... | B60R 9/06 |
| 2021/0331538 | A1 * | 10/2021 | Kato | ........................ | B60D 1/54 |
| 2022/0041419 | A1 * | 2/2022 | Ballard | ................... | B60R 11/06 |
| 2023/0051119 | A1 * | 2/2023 | Broadwell | ............. | A63B 55/60 |
| 2024/0399967 | A1 * | 12/2024 | Deshpande | .............. | B60R 9/02 |
| 2025/0162506 | A1 * | 5/2025 | Schaenzer | .............. | B60R 5/041 |
| 2025/0249324 | A1 * | 8/2025 | Dai | ........................ | A63B 55/61 |
| 2025/0249325 | A1 * | 8/2025 | Dai | ........................ | B60N 3/103 |
| 2025/0303975 | A1 * | 10/2025 | Dai | ........................... | B60R 9/06 |

* cited by examiner

*Primary Examiner* — Brian D Nash
(74) *Attorney, Agent, or Firm* — Cooper Legal Group, LLC

(57) ABSTRACT

A foldable storage basket of an electric cart includes a fixed frame, a basket body, and a folding and unfolding device. The basket body is configured to be folded onto or unfolded relative to the fixed frame. The basket body is configured to be unfolded to define a frame structure with a top opening. A rotation-limiting device is disposed between the fixed frame and the basket body. The rotation-limiting device includes one or more slow-descent devices. The one or more slow-descent devices are connected to a bottom plate of the basket body. At least one side of the bottom plate of the basket body is disposed with the one or more slow-descent devices. When the basket body is unfolded, the basket body is rotated downward, and the one or more slow-descent devices are configured to reduce a speed of a downward rotation of the bottom plate of the basket body.

18 Claims, 10 Drawing Sheets

A

32

B

1

ELECTRIC CART AND FOLDABLE STORAGE BASKET THEREOF

RELATED APPLICATIONS

This application claims priority to Chinese patent application number 202520449991.5, filed on Mar. 14, 2025. Chinese patent application number 202520449991.5 is incorporated herein by reference.

FIELD OF THE DISCLOSURE

The present disclosure relates to a foldable storage basket and in particular to an electric cart and a foldable storage basket thereof.

BACKGROUND OF THE DISCLOSURE

Electric carts are mainly used to transport people and backpacks and other items. Common electric carts include golf carts, sightseeing tour buses, shared battery carts, passenger battery carts, etc. In order to facilitate storage, a storage basket and a backpack rack are set on a back seat of the electric cart.

Currently, most storage baskets on the market feature a foldable design, including a base basket that expands and contracts through a hinged connection. This allows the storage basket to be folded up when not in use, reducing an occupied space, while unfolding when needed to increase storage capacity. However, this structure relies on steel wires on the sides of the base basket to secure the base basket when the base basket is unfolded. If the base basket suddenly falls downward, this can easily cause damage to the steel wires and the hinged connection.

BRIEF SUMMARY OF THE DISCLOSURE

The present disclosure aims to solve a problem that there is no buffer when a foldable storage basket is unfolded, which easily causes a steel wire to be damaged by instantaneous tightening, and thus provides a foldable storage basket for an electric cart.

In order to solve the above technical problems, the present disclosure provides a foldable storage basket of an electric cart, and the foldable storage basket comprises a fixed frame, a foldable basket body, and a device for opening and closing the foldable basket body. The foldable basket body is rotatably connected to the fixed frame, and the foldable basket body is configured to be folded to be fixed onto the fixed frame through the device for opening and closing the foldable basket body or unfolded relative to the fixed frame. The foldable basket body is configured to be unfolded to cooperate with the fixed frame to enclose a space to define a frame structure with a top opening. The fixed frame is mounted on the electric cart.

A rotation-limiting device is disposed between the fixed frame and the foldable basket body, and the rotation-limiting device comprises one or more slow-descent devices. The one or more slow-descent devices are connected to a bottom plate of the foldable basket body.

At least one side of the bottom plate of the foldable basket body is disposed with the one or more slow-descent devices. When the foldable basket body is unfolded after opening the device for opening and closing the foldable basket body, the foldable basket body is rotated downward, and the one or more slow-descent devices are configured to reduce a speed of a downward rotation of the bottom plate of the foldable basket body.

In a preferred embodiment, the rotation-limiting device comprises one or more pulling ropes, a first end of each of the one or more pulling ropes is fixedly connected to the fixed frame, and a second end of each of the one or more pulling ropes is fixedly connected to the bottom plate of the foldable basket body.

The one or more pulling ropes are disposed on the at least one side of the bottom plate of the foldable basket body. When the foldable basket body is unfolded, a triangular structure is formed between the fixed frame, the bottom plate of the foldable basket body, and the one or more pulling ropes.

In a preferred embodiment, the one or more slow-descent devices are pneumatic rods or hydraulic rods.

In a preferred embodiment, the foldable basket body comprises a fence rotatably connected to the bottom plate and two side fences rotatably connected to two sides of the fence, and the fence is disposed opposite to the fixed frame.

When folded, the two side fences are rotatably folded onto the fence, the fence is rotatably folded onto the bottom plate, and the bottom plate is rotatably folded onto the fixed frame.

When unfolded, the two side fences are rotated and unfolded relative to the fence, and ends of the two side fences away from the fence are detachably connected to the fixed frame.

In a preferred embodiment, an end of each of the two side fences away from the fence comprises an insertion member, and the fixed frame comprises an insertion hole corresponding to the insertion member. The insertion member comprises a housing and an insertion pin, and an elastic member is disposed in the housing.

The insertion pin is movably disposed in the housing, and a rear end of the insertion pin is connected to the elastic member.

The insertion pin is configured to extend out of or retract back to the housing with cooperation of the elastic member, and the insertion pin is configured to extend out of the housing to be disposed in the insertion hole.

The insertion member comprises an unlocking member, which is configured to act on the insertion pin to drive the insertion pin to be separated from the insertion hole to form a detachable connection.

In a preferred embodiment, the unlocking member comprises a protrusion disposed on the insertion pin and a sliding groove defined on the housing, and the protrusion is disposed in the sliding groove. The insertion pin is confined in the housing.

The sliding groove comprises a first groove and a second groove, and the protrusion is configured to slide along the sliding groove and is configured to be disposed in the first groove or the second groove.

When the protrusion is disposed in the first groove, the elastic member pushes out the insertion pin, the insertion pin is disposed in the insertion hole, and a corresponding one of the two side fences is connected to the fixed frame.

When the protrusion is disposed in the second groove, the insertion pin compresses the elastic member to retract back to the housing, the insertion pin is separated from the insertion hole, and the corresponding one of the two side fences is separated from the fixed frame.

In a preferred embodiment, the fixed frame comprises a side panel, and the side panel comprises a protruding post. The housing comprises a buckling hole.

The corresponding one of the two side fences is rotated relative to the fence to be unfolded, and the buckling hole is buckled to the protruding post.

In a preferred embodiment, the device for opening and closing the foldable basket body comprises a pin, a rotating member, a connecting rod connecting the pin and the rotating member, and a groove defined on the fixed frame.

The fixed frame comprises a side panel, and the groove is defined on the side panel. An opening with a rotation space is defined on a middle of the bottom plate of the foldable basket body, and the rotating member is disposed in the opening. The connecting rod is disposed in the bottom plate of the foldable basket body, and the pin extends out from a side of the bottom plate of the foldable basket body.

After the foldable basket body is folded, the opening is located on an outward side of the bottom plate of the foldable basket body. When the foldable basket body is folded on the fixed frame, the rotating member is configured to be rotated, so that the pin is driven to be buckled to the groove or separated from the groove.

In a preferred embodiment, the groove is a U-shaped groove with an opening facing the pin, and one end of the U-shaped groove is an arc-shaped structure with an arc surface facing upward, which is matched with a movement trajectory of the pin buckled to or separated from the groove.

The present disclosure provides an electric cart, and the electric cart comprises the foldable storage basket of the electric cart. The foldable storage basket is disposed at a cart rear portion of the electric cart. The electric cart is a golf cart, a sightseeing tour cart, a shared electric vehicle, or a passenger electric vehicle.

Compared with the existing techniques, the technical solution has the following advantages.

1. By arranging the one or more slow-descent devices on the at least one side of the bottom plate of the foldable basket body, when the foldable basket body is rotated relative to the fixed frame, the speed of the downward rotation of the bottom plate of the foldable basket body can be slowed down, thereby preventing the bottom plate of the foldable basket body from flipping down instantly, resulting in damage to the one or more pulling ropes caused by instantaneous tightening and damage to a pivotal connection of the bottom plate.

2. The foldable basket body of the foldable storage basket is rotatably connected to the fixed frame and can be folded onto the fixed frame or unfolded relative to the fixed frame through the device for opening and closing the foldable basket body. When the foldable basket body is unfolded relative to the fixed frame, the foldable basket body and the fixed frame form the frame structure with a top opening, which can hold more items and saves space when folded.

Figure 1:
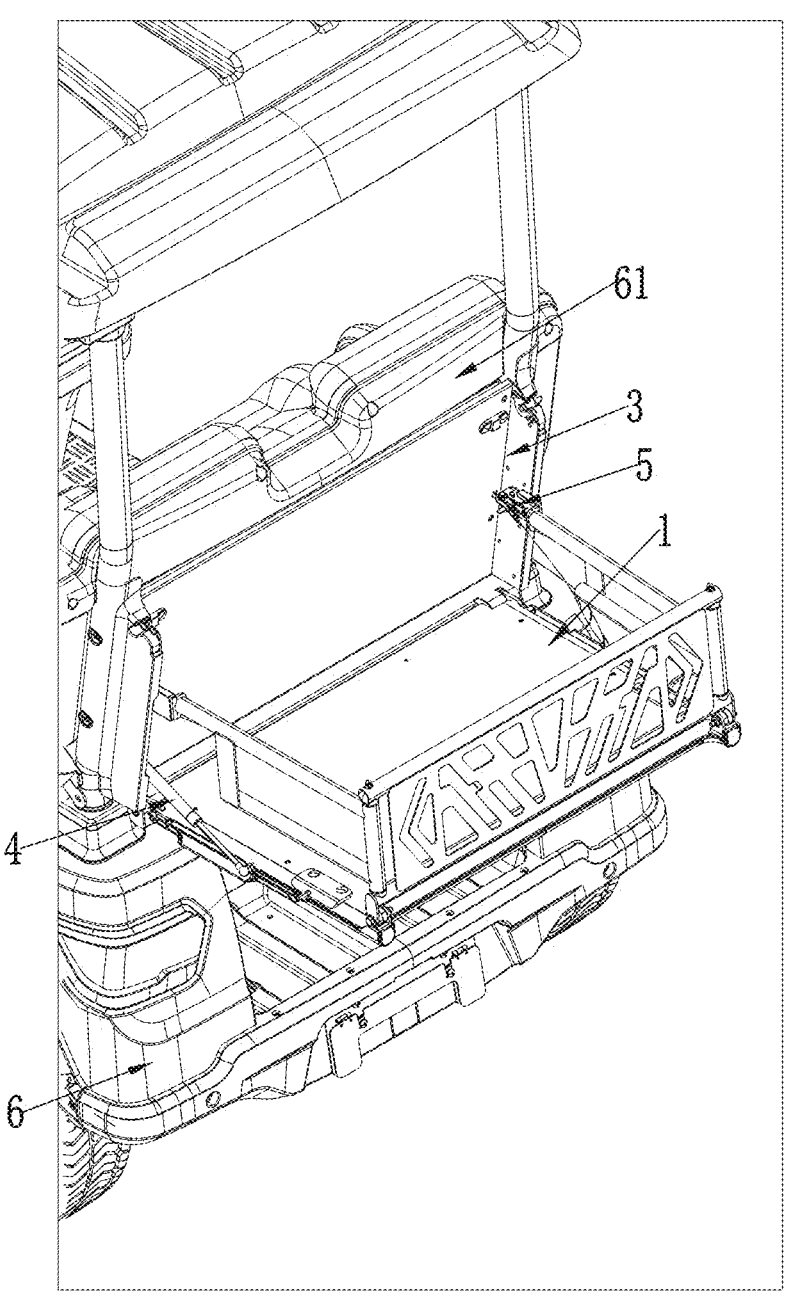
FIG. 1 is a perspective view of an unfolded state of a foldable storage basket at a cart rear portion of an electric cart in a preferred embodiment of the present disclosure.

Explanation of the accompanying reference numerals: 1. foldable basket body; 11. bottom plate; 111. opening; 12. fence; 13. side fence; 2. device for opening and closing foldable basket body; 21. pin; 22. rotating member; 23. groove; 231. arc-shaped structure; 24. connecting rod; 3. fixed frame; 31. insertion hole; 32. side panel; 33. protruding post; 4. rotation-limiting device; 41. slow-descent device; 42. pulling rope; 5. insertion member; 51. housing; 511. first groove; 512. second groove; 513. buckling hole; 52. insertion pin; 521. protrusion; 53. elastic member; 6. electric cart; 61. cart rear portion.

DETAILED DESCRIPTION OF THE EMBODIMENTS

The technical solutions in the embodiments of the present disclosure will be clearly and completely described below in conjunction with the drawings in the embodiments of the present disclosure. It is obvious that the described embodiments are only part of the embodiments of the present disclosure, rather than all the embodiments. Based on the embodiments of the present disclosure, all other embodiments obtained by ordinary technicians in this field without making creative work are within the scope of protection of the present disclosure.

In the description of this disclosure, it should be noted that the terms "upper," "lower," "inner," "outer," "top," "bottom," and the like, indicating orientations or positional relationships, are based on the orientations or positional relationships shown in the accompanying drawings and are intended solely to facilitate the description of this disclosure and simplify the description. They are not intended to indicate or imply that the devices or components referred to must have a specific orientation, be constructed, or operate in a specific orientation. Therefore, they should not be construed as limitations on this disclosure. Furthermore, the terms "first" and "second" are used for descriptive purposes only and should not be construed as indicating or implying relative importance.

In the description of the present disclosure, it should be noted that, unless otherwise clearly specified and limited, the terms "installed", "provided with", "sleeved on", "connected", etc. should be understood in a broad sense. For example, "connection" can be a wall-mounted connection, a detachable connection, or an integral connection. It can be a mechanical connection or an electrical connection. It can be a direct connection or an indirect connection through an intermediate medium. It can be the internal connection of two components. For ordinary technicians in this field, the specific meanings of the above terms in the present disclo-sure can be understood according to specific circumstances.

Referring to FIGS. 1-12, this embodiment provides a foldable storage basket of an electric cart 6. The foldable storage basket provided in this embodiment is disposed at a cart rear portion 61 of the electric cart 6. The electric cart 6 can be a golf cart, a sightseeing tour cart, a shared electric vehicle, a passenger electric vehicle, etc.

Figure 12:
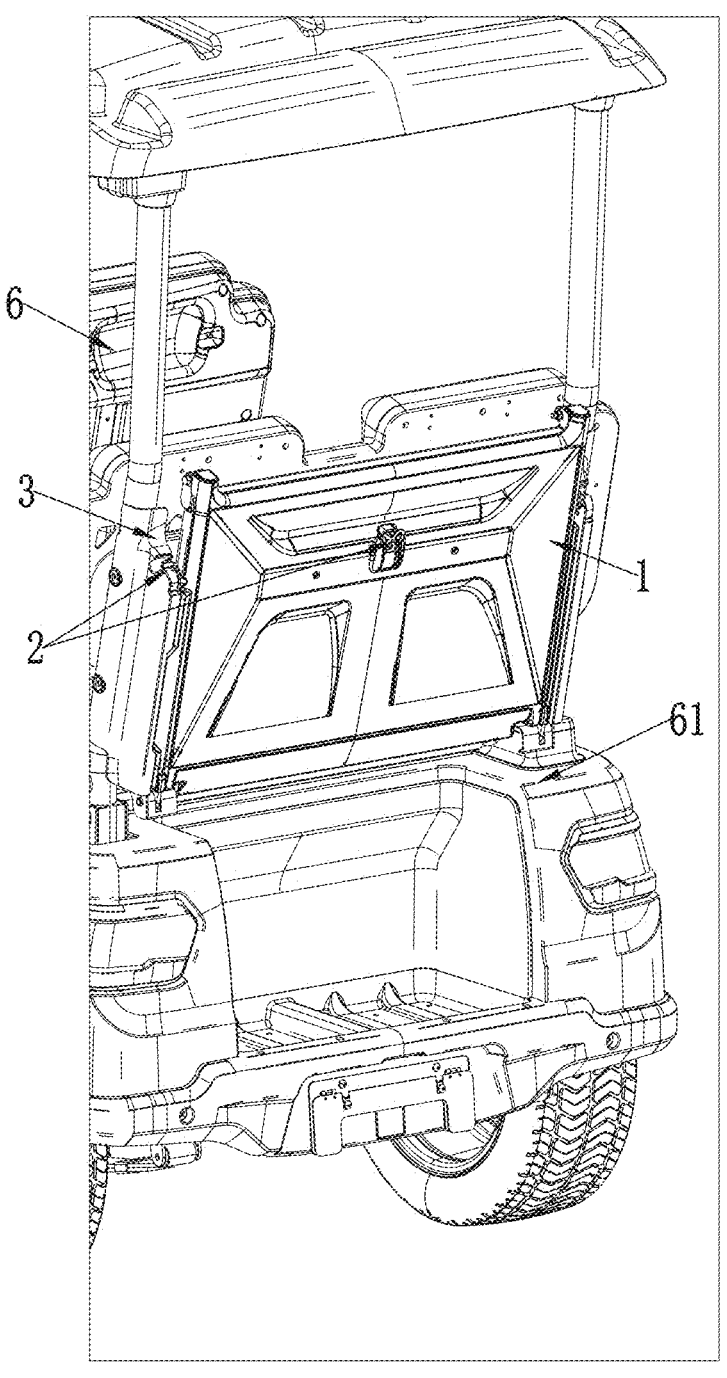
FIG. 12 is a perspective view of the folded state of the foldable storage basket at the cart rear portion of the electric cart in the preferred embodiment of the present disclosure.

The foldable storage basket comprises a fixed frame 3, a foldable basket body 1, and a device 2 for opening and closing the foldable basket body 1. The fixed frame 3 is mounted on the cart rear portion 61 of the electric cart 6. The foldable basket body 1 is rotatably connected to the fixed frame 3 and is folded onto the fixed frame 3 through the device 2 for opening and closing the foldable basket body 1 or unfolded relative to the fixed frame 3. The foldable basket body 1 is unfolded to cooperate with the fixed frame 3 to enclose a space to define a frame structure with a top opening (as shown in FIG. 1), and the frame structure is used for storage. The foldable basket body 1 can be folded and stored on the fixed frame 3 (as shown in FIG. 12), which is convenient for storage and saves space.

A rotation-limiting device 4 is disposed between the fixed frame 3 and the foldable basket body 1. The rotation-limiting device 4 comprises one or more slow-descent devices 41. The one or more slow-descent devices 41 are pneumatic rods or hydraulic rods. The one or more slow-descent devices 41 are connected to a bottom plate 11 of the foldable basket body 1 and are disposed on at least one side of the bottom plate 11 of the foldable basket body 1. When the foldable basket body 1 is rotated downward, the bottom plate 11 of the foldable basket body 1 is rotated downward, and the one or more slow-descent devices 41 are configured to reduce a speed of a downward rotation of the bottom plate 11 of the foldable basket body 1.

The rotation-limiting device 4 further comprises one or more pulling ropes 42. A first end of each of the one or more pulling ropes 42 is fixedly connected to the fixed frame 3, and a second end of each of the one or more pulling ropes 42 is fixedly connected to the bottom plate 11 of the foldable basket body 1. The one or more pulling ropes 42 are disposed on the at least one side of the bottom plate 11 of the foldable basket body 1. When the foldable basket body 1 is unfolded after opening the device 2 for opening and closing the foldable basket body 1, a triangular structure is formed between the fixed frame 3, the bottom plate 11 of the foldable basket body 1, and the one or more pulling ropes 42, making the unfolded storage basket structure more stable. The one or more pulling ropes 42 can be made of plastic, fiber, metal, or other materials.

Figure 2:
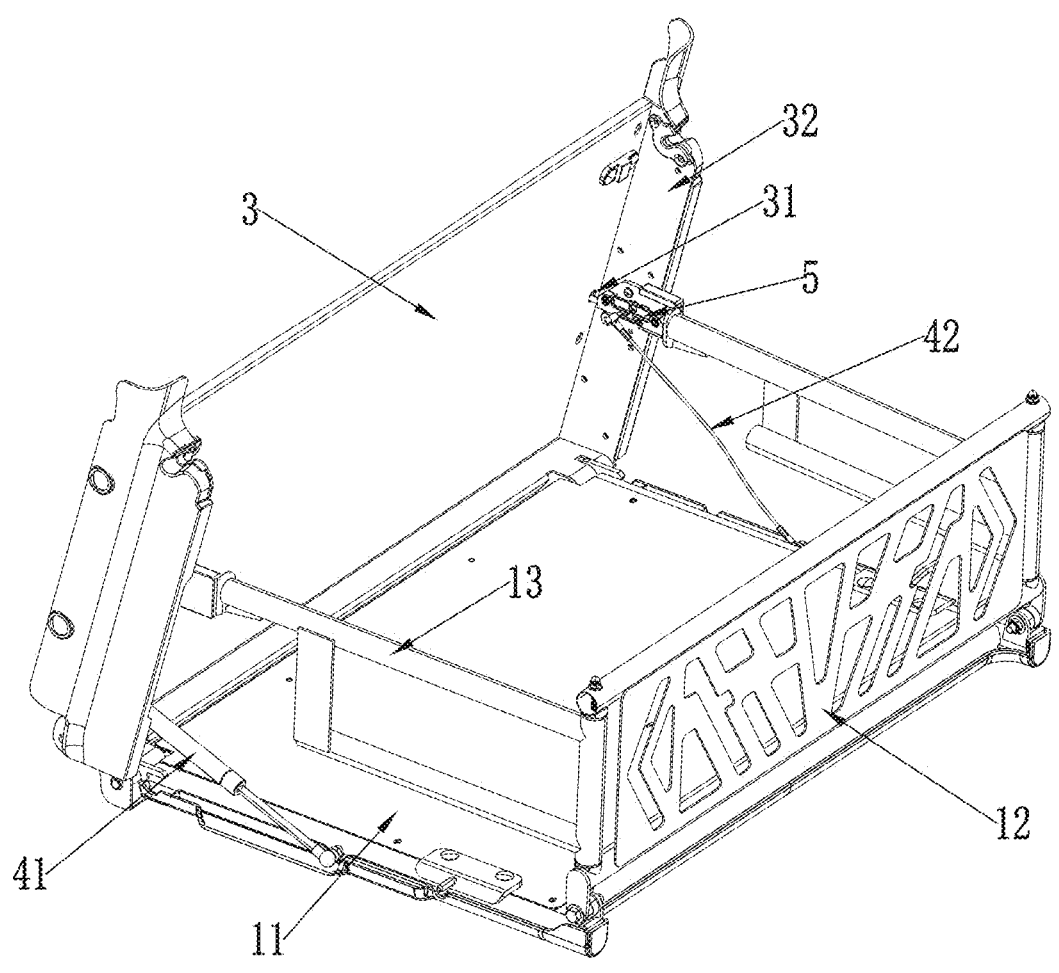
FIG. 2 is a perspective view of a foldable basket body of the foldable storage basket in the unfolded state in the preferred embodiment of the present disclosure.

In this embodiment, as shown in FIG. 2, the one or more slow-descent devices 41 are disposed on one side of the bottom plate 11 of the foldable basket body 1, and the one or more pulling ropes 42 are disposed on the other side of the bottom plate 11 of the foldable basket body 1. The one or more slow-descent devices 41 can prevent the bottom plate 11 of the foldable basket body 1 from instantly rotating downward. When the device 2 for opening and closing the foldable basket body 1 releases a locking connection between the foldable basket body 1 and the fixed frame 3, the bottom plate 11 of the foldable basket body 1 is slowly lowered by the one or more slow-descent devices 41. The one or more pulling ropes 42 are gradually pulled apart until the one or more pulling ropes 42 are straightened to form the triangular structure with the fixed frame 3 and the bottom plate 11 of the foldable basket body 1. When the foldable basket body 1 needs to be folded, an external force is applied to press the one or more slow-descent devices 41, and the bottom plate 11 of the foldable basket body 1 is folded onto the fixed frame 3.

Figure 3:
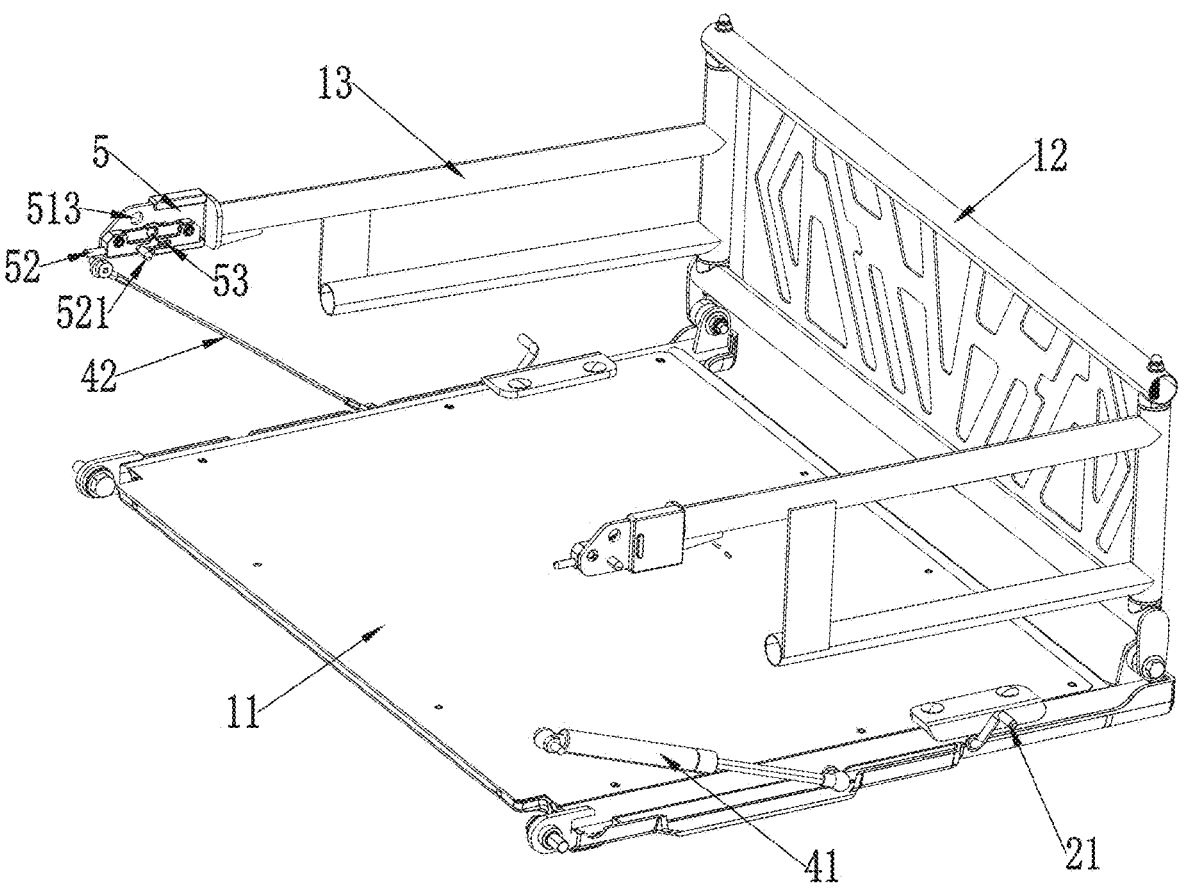
FIG. 3 is a perspective view of an overall structure of the foldable storage basket in the preferred embodiment of the present disclosure.
Figure 4:
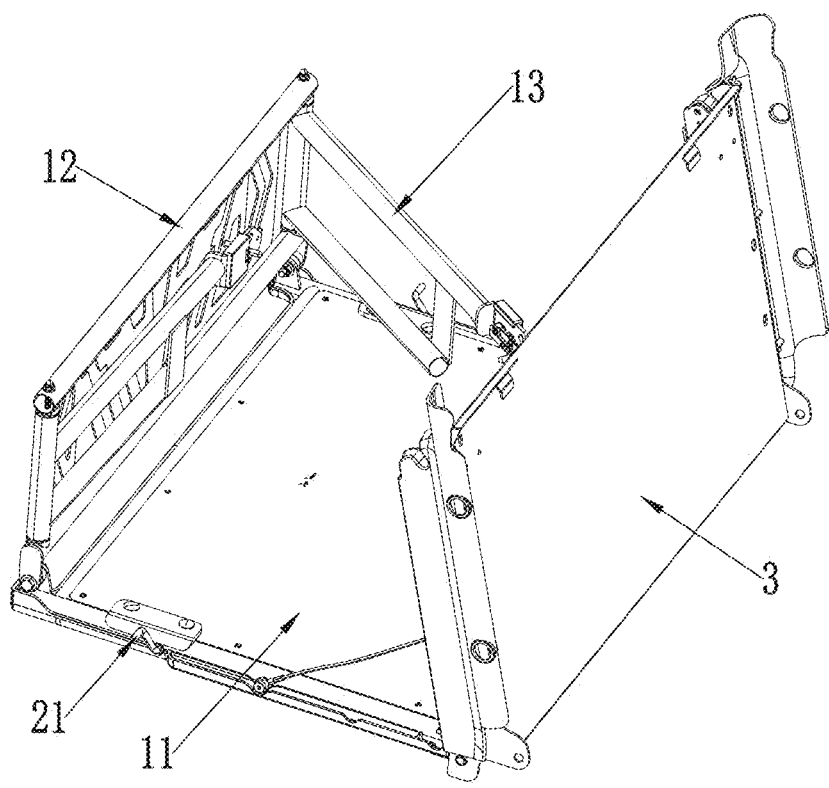
FIG. 4 is a perspective view of the foldable storage basket in a folded state with two side fences in the preferred embodiment of the present disclosure.
Figure 5:
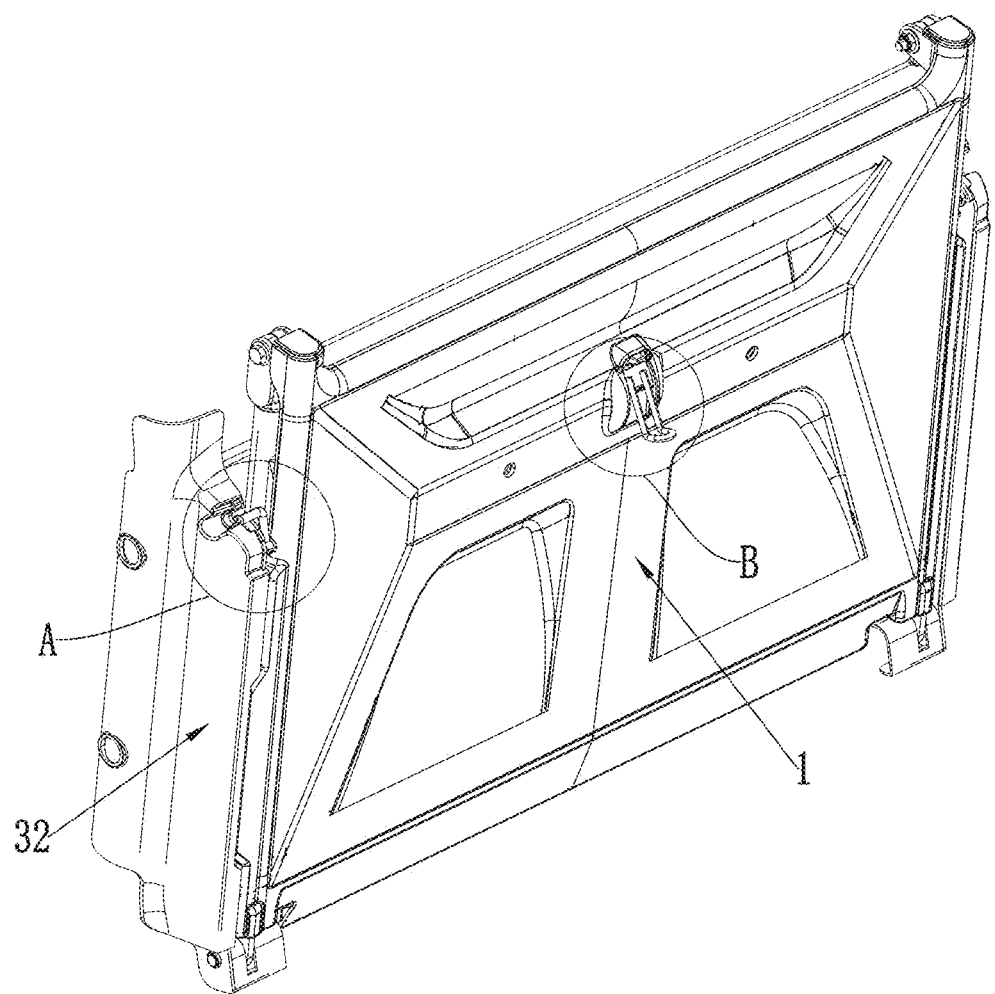
FIG. 5 is a perspective view of the foldable storage basket folded onto a fixed frame in the preferred embodiment of the present disclosure.

As shown in FIG. 3, a specific structure of the foldable basket body 1 is described as follows. The foldable basket body 1 comprises a fence 12 rotatably connected to the bottom plate 11, and two side fences 13 rotatably connected to two sides of the fence 12. The fence 12 is disposed opposite to the fixed frame 3. When folded, the two side fences 13 are rotatably folded onto the fence 12, the fence 12 is rotatably folded onto the bottom plate 11, and the bottom plate 11 is rotatably folded onto the fixed frame 3. When unfolded, the two side fences 13 are rotated and unfolded relative to the fence 12, and ends of the two side fences 13 away from the fence 12 are detachably connected to the fixed frame 3. FIG. 4 shows a perspective view of an unfolded state of the two side fences 13 when the two side fences 13 are rotated relative to the fence 12. It should be noted that a rotatable connection mentioned herein can be achieved by a rotating shaft or by direct hinge connection. This rotatable connection is an existing technology and will not be described in detail hereinafter.

As shown in FIGS. 4-10, the device 2 for opening and closing the foldable basket body 1 comprises a pin 21, a rotating member 22, a connecting rod 24 connecting the pin 21 and the rotating member 22, and a groove 23 defined on the fixed frame 3. The fixed frame 3 comprises a side panel 32, and the groove 23 is defined on the side panel 32. An opening 111 with a rotation space is defined on a middle of the bottom plate 11 of the foldable basket body 1, and the rotating member 22 is disposed in the opening 111. The connecting rod 24 is disposed in the bottom plate 11 of the foldable basket body 1, and the pin 21 extends out from a side of the bottom plate 11 of the foldable basket body 1. After the foldable basket body 1 is folded, the opening 111 is located on an outward side of the bottom plate 11 of the foldable basket body 1. When the foldable basket body 1 is folded on the fixed frame 3, the rotating member 22 is rotated, and the pin 21 is buckled to the groove 23 or separated from the groove 23. The groove 23 is a U-shaped groove with an opening facing the pin 21. One end of the U-shaped groove is an arc-shaped structure 231 with an arc surface facing upward, which is matched with a movement trajectory of the pin 21 buckled to or separated from the groove 23.

Figure 6:
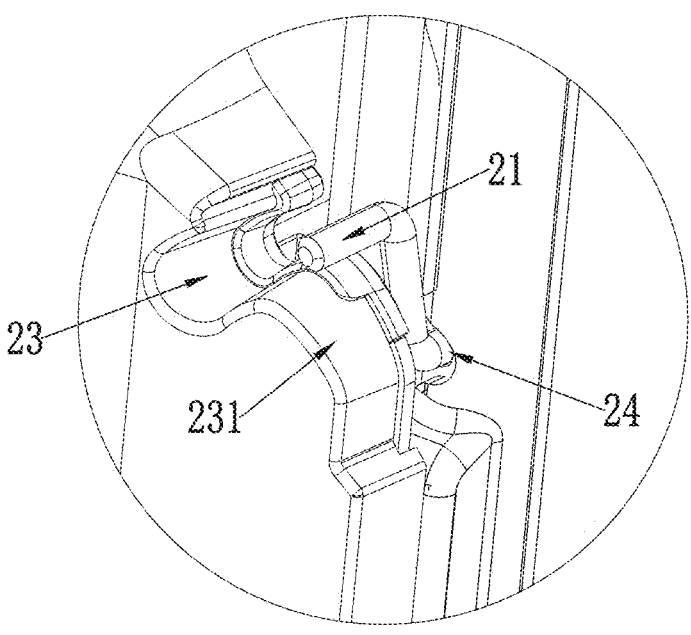
FIG. 6 is an enlarged view of portion A in FIG. 5.
Figure 7:
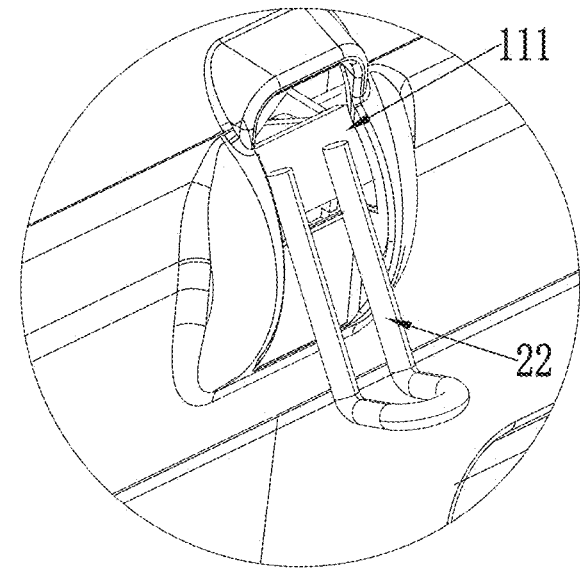
FIG. 7 is an enlarged view of portion B in FIG. 5.
Figure 8:
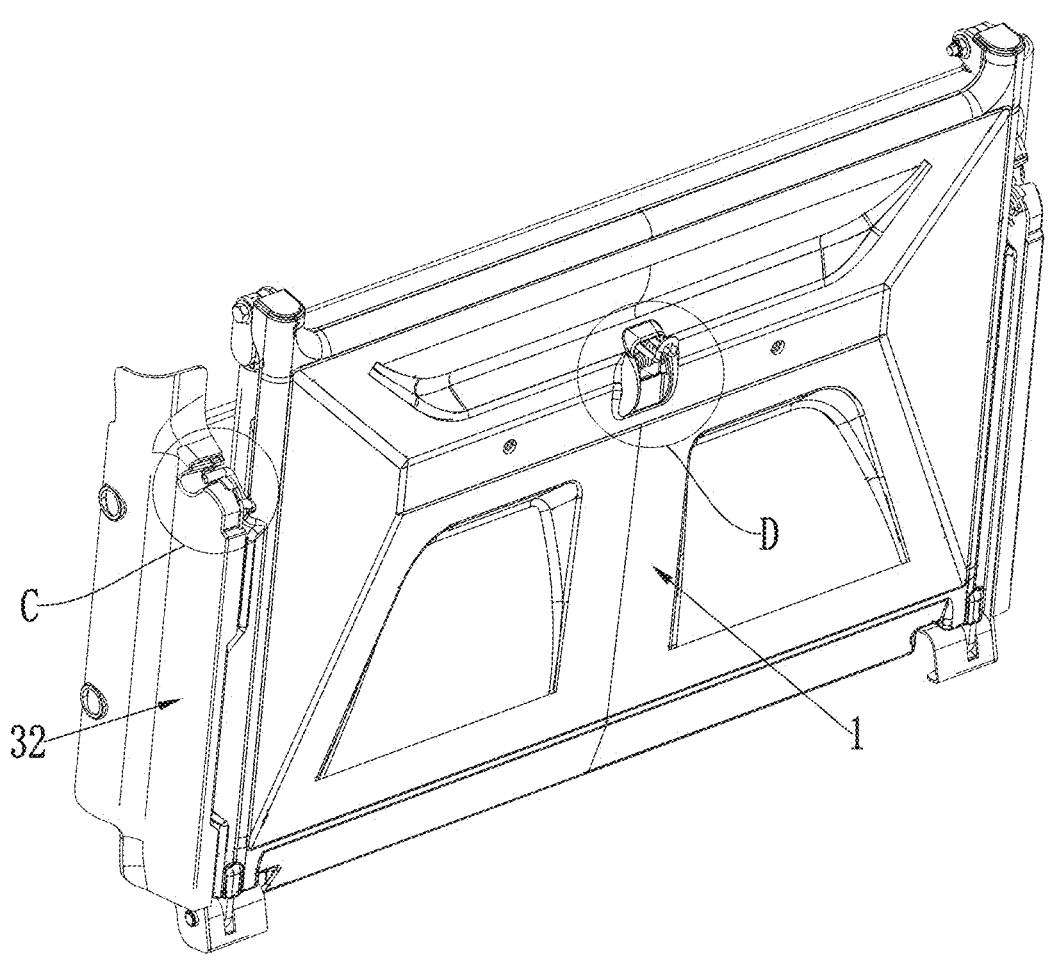
FIG. 8 is a perspective view of the foldable basket body fixed to the fixed frame by a device for opening and closing the foldable basket body in the preferred embodiment of the present disclosure.
Figure 9:
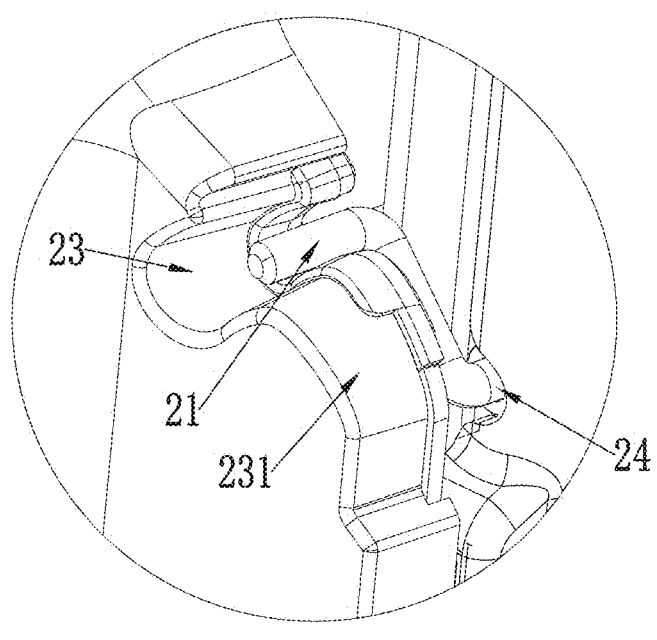
FIG. 9 is an enlarged view of portion C in FIG. 8.
Figure 10:
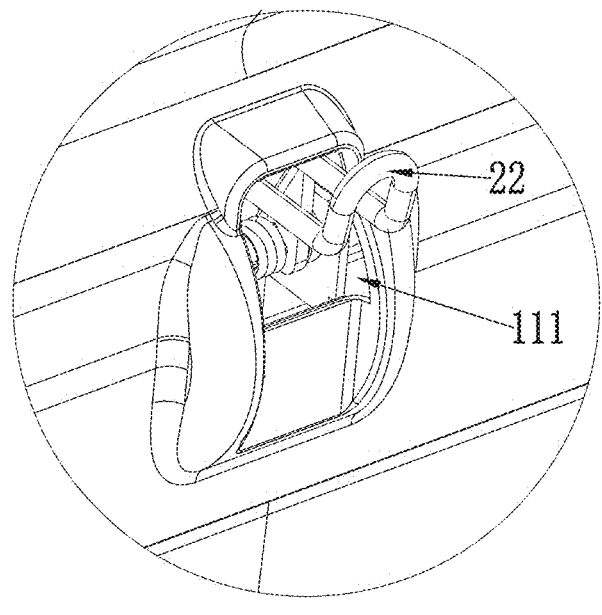
FIG. 10 is an enlarged view of portion D in FIG. 8.

An operation of the device 2 for opening and closing the foldable basket body 1 is described as follows. When the foldable basket body 1 needs to be unfolded for use, the foldable basket body 1 is released relative to the fixed frame 3 through the device 2 for opening and closing the foldable basket body 1. As shown in FIG. 7, the rotating member 22 is rotated downward, and the rotating member 22 is rotated outward from the opening 111. A rotation of the rotating member 22 drives the pin 21 to rotate through the connecting rod 24. As shown in FIG. 6, the pin 21 moves outward from the groove 23 and is separated from the groove 23 along the arc-shaped structure 231. At this time, the foldable basket body 1 can be rotated downward relative to the fixed frame 3 and unfolded to form the frame structure. When the foldable basket body 1 is folded onto the fixed frame 3, as shown in FIG. 10, the rotating member 22 is rotated upward, and the rotating member 22 is inserted into the opening 111. The rotation of the rotating member 22 drives the pin 21 to rotate through the connecting rod 24. As shown in FIG. 9, the pin 21 moves toward the groove 23 and is buckled to the groove 23 along the arc-shaped structure 231, fixing the foldable basket body 1 to the fixed frame 3 and maintaining a folded state of the foldable basket body 1.

Figure 11:
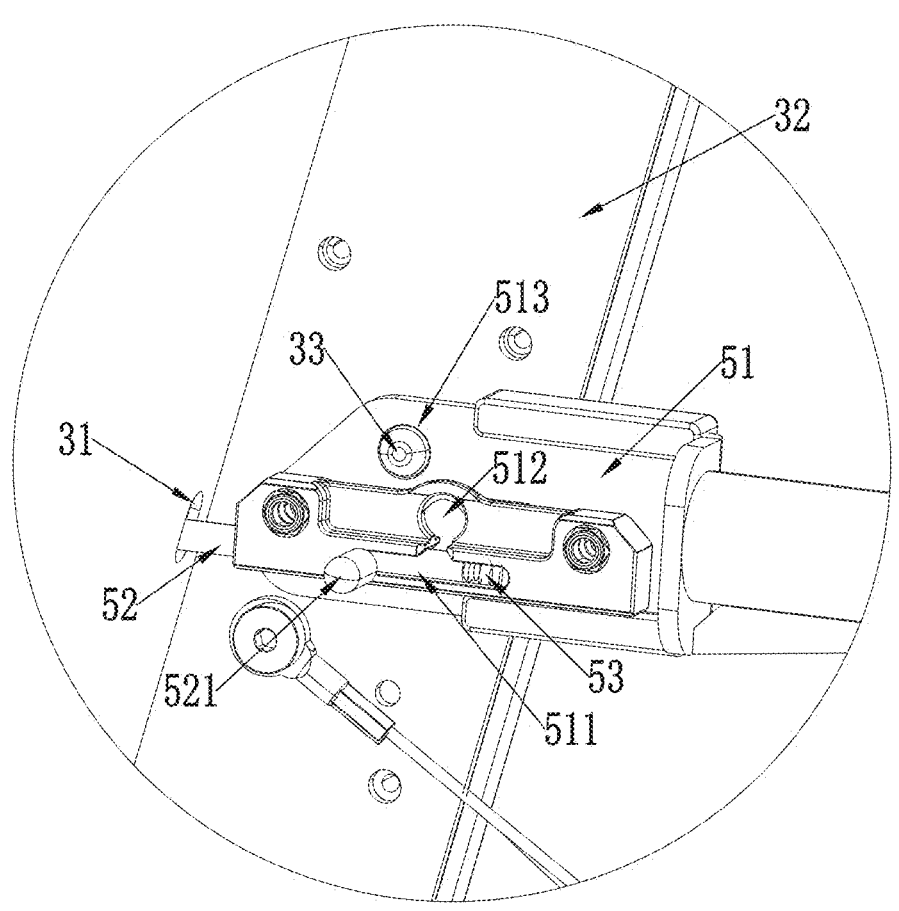
FIG. 11 is a perspective view of a detachable connection between one of the two side fences and the fixed frame in the preferred embodiment of the present disclosure.

As shown in FIG. 11, a structure of a detachable connection between each of the two side fences 13 and the fixed frame 3 is that an end of each of the two side fences 13 away from the fence 12 comprises an insertion member 5 (as shown in FIG. 3), and the fixed frame 3 comprises an insertion hole 31 corresponding to the insertion member 5. The insertion member 5 comprises a housing 51 and an insertion pin 52, and an elastic member 53 is disposed in the housing 51. The insertion pin 52 is movably disposed in the housing 51, and a rear end of the insertion pin 52 is connected to the elastic member 53. The insertion pin 52 can extend out of or retract back to the housing 51 with cooperation of the elastic member 53, and the insertion pin 52 can extend out of the housing 51 to be inserted into the insertion hole 31. The insertion member 5 comprises an unlocking member, which acts on the insertion pin 52 to drive the insertion pin 52 to be separated from the insertion hole 31 to form a detachable connection. When the foldable basket body 1 is rotated downward to straighten the one or more pulling ropes 42, the fence 12 is rotated and unfolded relative to the bottom plate 11 of the foldable basket body 1 (as shown in FIG. 4). After the two side fences 13 are rotated and unfolded relative to the fence 12, the two side fences 13 are connected to the insertion holes 31 using the insertion members 5 (as shown in FIG. 11), thereby fixing the two side fences 13 on the fixed frame 3.

As shown in FIG. 11, the unlocking member comprises a protrusion 521 disposed on the insertion pin 52 and a sliding groove defined on the housing 51, and the protrusion 521 is disposed in the sliding groove. The insertion pin 52 is confined in the housing 51. The sliding groove comprises a first groove 511 and a second groove 512, and the protrusion 521 slides along the sliding groove and can be disposed in the first groove 511 or the second groove 512. When the protrusion 521 is disposed in the first groove 511, the elastic member 53 pushes out the insertion pin 52, the insertion pin 52 is inserted into the insertion hole 31, and a corresponding one of the two side fences 13 is connected to the fixed frame 3. When the protrusion 521 is disposed in the second groove 512, the insertion pin 52 compresses the elastic member 53 to retract back to the housing 51, the insertion pin 52 is separated from the insertion hole 31, and the corresponding one of the two side fences 13 is separated from the fixed frame 3.

To ensure the foldable storage basket can better support weight when unfolded, a load-bearing structure is added between the insertion member 5 and the fixed frame 3 to provide a load-bearing effect. The fixed frame 3 comprises a side panel 32, and the side panel 32 comprises a protruding post 33. The housing 51 comprises a buckling hole 513. The corresponding one of the two side fences 13 is rotated relative to the fence 12 to be unfolded, and the buckling hole 513 is buckled to the protruding post 33, forming the load-bearing structure.

The above is only a preferred specific implementation method of the present disclosure, but the design concept of the present disclosure is not limited to this. Any technician familiar with the technical field who uses this concept to make non-substantial changes to the present disclosure within the technical scope disclosed by the present disclosure shall be deemed to infringe the protection scope of the present disclosure.

What is claimed is:

1. A foldable storage basket of an electric cart, comprising:
a fixed frame,
a foldable basket body, and
a device for opening and closing the foldable basket body, wherein:
the foldable basket body is rotatably connected to the fixed frame,
the foldable basket body is configured to be folded to be fixed onto the fixed frame through the device for opening and closing the foldable basket body or unfolded relative to the fixed frame,
the foldable basket body is configured to be unfolded to cooperate with the fixed frame to enclose a space to define a frame structure with a top opening,
the fixed frame is mounted on the electric cart,
a rotation-limiting device is disposed between the fixed frame and the foldable basket body,
the rotation-limiting device comprises one or more slow-descent devices,
the one or more slow-descent devices are connected to a bottom plate of the foldable basket body,
at least one side of the bottom plate of the foldable basket body is disposed with the one or more slow-descent devices, and
when the foldable basket body is unfolded after opening the device for opening and closing the foldable basket body:
the foldable basket body is rotated downward, and
the one or more slow-descent devices are configured to reduce a speed of a downward rotation of the bottom plate of the foldable basket body.

2. The foldable storage basket of the electric cart according to claim 1, wherein:
the rotation-limiting device comprises one or more pulling ropes,
a first end of each of the one or more pulling ropes is fixedly connected to the fixed frame,
a second end of each of the one or more pulling ropes is fixedly connected to the bottom plate of the foldable basket body,
the one or more pulling ropes are disposed on the at least one side of the bottom plate of the foldable basket body, and
when the foldable basket body is unfolded, a triangular structure is formed between the fixed frame, the bottom plate of the foldable basket body, and the one or more pulling ropes.

3. An electric cart, comprising:
the foldable storage basket of the electric cart according to claim 2, wherein:
the foldable storage basket is disposed at a cart rear portion of the electric cart, and
the electric cart is a golf cart, a sightseeing tour cart, a shared electric vehicle, or a passenger electric vehicle.

4. The foldable storage basket of the electric cart according to claim 1, wherein:
the one or more slow-descent devices are pneumatic rods or hydraulic rods.

5. An electric cart, comprising:
the foldable storage basket of the electric cart according to claim 4, wherein:
the foldable storage basket is disposed at a cart rear portion of the electric cart, and the electric cart is a golf cart, a sightseeing tour cart, a shared electric vehicle, or a passenger electric vehicle.

6. The foldable storage basket of the electric cart according to claim 1, wherein:
the foldable basket body comprises a fence rotatably connected to the bottom plate and two side fences rotatably connected to two sides of the fence,
the fence is disposed opposite to the fixed frame,
when folded:
the two side fences are rotatably folded onto the fence,
the fence is rotatably folded onto the bottom plate, and
the bottom plate is rotatably folded onto the fixed frame, and
when unfolded:
the two side fences are rotated and unfolded relative to the fence, and
ends of the two side fences away from the fence are detachably connected to the fixed frame.

7. The foldable storage basket of the electric cart according to claim 6, wherein:
an end of each of the two side fences away from the fence comprises an insertion member,
the fixed frame comprises an insertion hole corresponding to the insertion member,
the insertion member comprises a housing and an insertion pin,
an elastic member is disposed in the housing,
the insertion pin is movably disposed in the housing,
a rear end of the insertion pin is connected to the elastic member,
the insertion pin is configured to extend out of or retract back to the housing with cooperation of the elastic member,
the insertion pin is configured to extend out of the housing to be disposed in the insertion hole, and
the insertion member comprises an unlocking member, which is configured to act on the insertion pin to drive the insertion pin to be separated from the insertion hole to form a detachable connection.

8. The foldable storage basket of the electric cart according to claim 7, wherein:
the unlocking member comprises a protrusion disposed on the insertion pin and a sliding groove defined on the housing,
the protrusion is disposed in the sliding groove,
the insertion pin is confined in the housing,
the sliding groove comprises a first groove and a second groove,
the protrusion is configured to slide along the sliding groove and is configured to be disposed in the first groove or the second groove,
when the protrusion is disposed in the first groove:
the elastic member pushes out the insertion pin,
the insertion pin is disposed in the insertion hole, and
a corresponding one of the two side fences is connected to the fixed frame, and when the protrusion is disposed in the second groove:
the insertion pin compresses the elastic member to retract back to the housing,
the insertion pin is separated from the insertion hole, and
the corresponding one of the two side fences is separated from the fixed frame.

9. The foldable storage basket of the electric cart according to claim 8, wherein:

the fixed frame comprises a side panel,
the side panel comprises a protruding post,
the housing comprises a buckling hole,
the corresponding one of the two side fences is rotated relative to the fence to be unfolded, and
the buckling hole is buckled to the protruding post.

10. An electric cart, comprising:
the foldable storage basket of the electric cart according to claim 6, wherein:
the foldable storage basket is disposed at a cart rear portion of the electric cart, and
the electric cart is a golf cart, a sightseeing tour cart, a shared electric vehicle, or a passenger electric vehicle.

11. An electric cart, comprising:
the foldable storage basket of the electric cart according to claim 7, wherein:
the foldable storage basket is disposed at a cart rear portion of the electric cart, and
the electric cart is a golf cart, a sightseeing tour cart, a shared electric vehicle, or a passenger electric vehicle.

12. An electric cart, comprising:
the foldable storage basket of the electric cart according to claim 8, wherein:
the foldable storage basket is disposed at a cart rear portion of the electric cart, and
the electric cart is a golf cart, a sightseeing tour cart, a shared electric vehicle, or a passenger electric vehicle.

13. An electric cart, comprising:
the foldable storage basket of the electric cart according to claim 9, wherein:
the foldable storage basket is disposed at a cart rear portion of the electric cart, and
the electric cart is a golf cart, a sightseeing tour cart, a shared electric vehicle, or a passenger electric vehicle.

14. The foldable storage basket of the electric cart according to claim 1, wherein:
the device for opening and closing the foldable basket body comprises a pin, a rotating member, a connecting rod connecting the pin and the rotating member, and a groove defined on the fixed frame,
the fixed frame comprises a side panel,
the groove is defined on the side panel,
an opening with a rotation space is defined on a middle of the bottom plate of the foldable basket body,
the rotating member is disposed in the opening,
the connecting rod is disposed in the bottom plate of the foldable basket body,
the pin extends out from a side of the bottom plate of the foldable basket body,
after the foldable basket body is folded, the opening is located on an outward side of the bottom plate of the foldable basket body, and
when the foldable basket body is folded on the fixed frame, the rotating member is configured to be rotated, so that the pin is driven to be buckled to the groove or separated from the groove.

15. The foldable storage basket of the electric cart according to claim 14, wherein:
the groove is a U-shaped groove with an opening facing the pin, and
one end of the U-shaped groove is an arc-shaped structure with an arc surface facing upward, which is matched with a movement trajectory of the pin buckled to or separated from the groove.

16. An electric cart, comprising:

the foldable storage basket of the electric cart according to claim 14, wherein:

the foldable storage basket is disposed at a cart rear portion of the electric cart, and the electric cart is a golf cart, a sightseeing tour cart, a shared electric vehicle, or a passenger electric vehicle.

17. An electric cart, comprising:

the foldable storage basket of the electric cart according to claim 15, wherein:

the foldable storage basket is disposed at a cart rear portion of the electric cart, and the electric cart is a golf cart, a sightseeing tour cart, a shared electric vehicle, or a passenger electric vehicle.

18. An electric cart, comprising:

the foldable storage basket of the electric cart according to claim 1, wherein:

the foldable storage basket is disposed at a cart rear portion of the electric cart, and the electric cart is a golf cart, a sightseeing tour cart, a shared electric vehicle, or a passenger electric vehicle.

* * * * *